July 8, 1952     F. W. OFELDT     2,602,201
DOORSTOP
Filed June 26, 1947
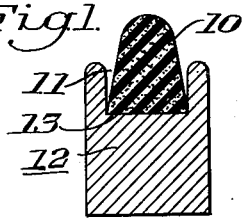
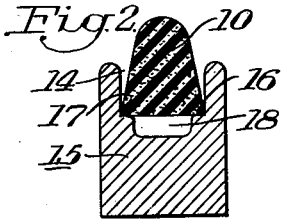
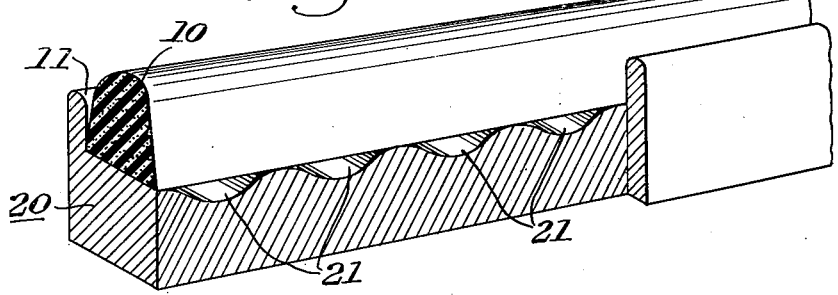
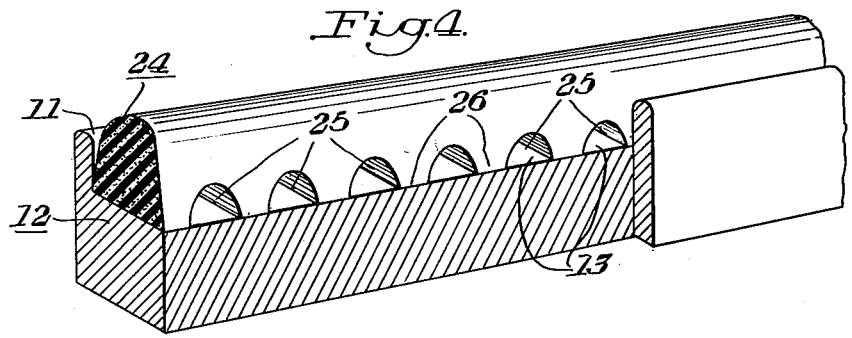
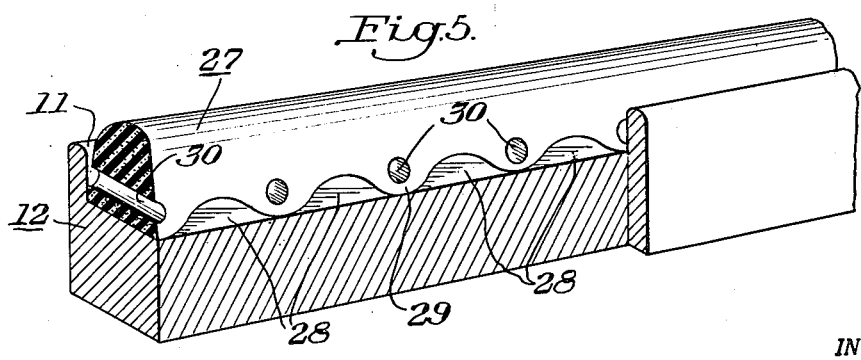
INVENTOR.
FRANK W. OFELDT
BY
William D. Carothers
HIS ATTORNEY Patented July 8, 1952

2,602,201

UNITED STATES PATENT OFFICE 2,602,201

DOORSTOP

Frank W. Ofeldt, Carnot, Pa., assignor to William D. Carothers, Allegheny County, Pa.

Application June 26, 1947, Serial No. 757,126

2 Claims. (Cl. 20—68)

This invention relates generally to door stops, and more particularly to resilient door stops.

The use of resilient door stops made of an elastomer such as natural rubber, synthetic rubber, or a resilient plastic composition is old in the art. Some have been constructed of folded rubber strips of tubular members having an air chamber therein and others have been made of solid or sponge rubber. The hollow stops made of rubber strips usually have the marginal edges of the strips cemented, wedged, or clamped in a groove with the protruding hollow loop arranged to be flattened or deformed when engaged by the door. These stops are very soft and are materially flexed when used, causing them to readily disintegrate. The tubular members or hose frequently fail for the same reason and the cylindrical forms are difficult to mount as less than half of the hose extends from the retaining groove, providing a very small portion for flexing. Another difficulty in this form of stop is the problem of cementing the hose in the groove. The contacting surface is small and lends itself to fracture when the hose is flexed by engagement of the door.

The solid and sponge rubber stops are usually made wedge-shaped and they completely fill the groove thus relying upon that portion of the rubber outside of the groove to provide all the necessary resiliency. This form in sponge rubber provides a resilient pad that is too hard as a door stop. It can be easily deformed by the fingers but the whole of the strip provides considerable resistance to deformation when engaged by the door. Only that portion protruding beyond the stop frame is available for deformation as the wedged or parallel sides are either tight or cemented to the groove in the stop frame. In those instances where the rubber member is pinched by the groove substantially no resiliency is assumed by the rubber in the groove. Flow of the rubber through the restricted portion is blocked and deformation is entirely outside of the groove.

The principal object of this invention is the provision of an improved rubber door stop which overcomes the disadvantages of those known in the art.

Another object is the provision of a soft door stop that yields more readily and provides an improved cushioning effect utilizing substantially the whole of the cross-section of the resilient stop giving longer life and increased efficiency.

Another object is the provision of a soft door stop that may be cemented in place without hindering the resiliency of its operation or tendency to break the cement joint.

Another object is the provision of a door stop that is provided with room for flow when deformed to utilize the whole of the resilient material in producing a soft door stop.

Other objects and advantages appear in the following description and claims.

Practical embodiments illustrating the principles of this invention are disclosed in the accompanying drawing wherein, Fig. 1 is a sectional view of a door stop comprising this invention wherein the resilient door stop is continuously supported on its under side.

Fig. 2 is a sectional view showing a resilient door stop supported by its inner marginal edges but may flow upon deformation into a continuous marginal groove.

Fig. 3 is a perspective view partly in section showing an undulated flow chamber in the bottom of the groove in the stop member.

Fig. 4 is a view similar to Fig. 3 illustrating a method of increasing the softness of the door stop by providing a series of voids in the bottom of the rubber member.

Fig. 5 is a modification of Fig. 4 wherein the contour of the voids are changed.

Referring to Fig. 1 of the drawings 10 represents the sponge rubber door stop which has a cross-section that is substantially frusto conical with a rounded top. This stop is mounted in the groove 11 of the door stop frame 12. This door stop frame may be constructed of wood, metal, or other suitable material and the groove 11 is provided with parallel walls. The rubber stop 10 is substantially half as high as the groove 11 is deep. The bottom of the rubber member 10 is in full engagement along its width and length with the bottom 13 of the groove 11 and may be conveniently cemented thereto. When the door engages the rubber member 10 it is caused to deform and flow laterally in both directions. The air cells of the sponge rubber collapse and the configuration of the whole rubber member changes causing it to flow laterally to completely fill the groove 11 which represents the flow chamber, and overhang the side edges thereof. This extra volume in the groove due to the tapered shape of the rubber stop produces a much softer door stop. Substantially the whole of the sponge rubber is worked and deformed and there is no friction created between the surface of the rubber and the side walls of the groove as in the case where the sides of the rubber are parallel in surface engagement with the side walls of the groove.

In the structure shown in Fig. 2 the sponge rubber member 10 is the same as that shown in Fig. 1 but it is placed in the groove 14 of the door stop 15. This groove 14 is slightly narrower and provides surface contact along the ledges 16 and side walls 17 adjacent the lower edges of the rubber member 10 where the latter may be cemented in place. Intermediate the ledges 16 the bottom of the groove is slotted out as indicated at 18. Since the groove 14 is slightly smaller than the width of the rubber 10 the bottom of the rubber member bulges slightly into this slot and when the rubber member is engaged by the door it is deformed filling the upper portion of the groove 14 and the slot 18, both of which represent the flow chamber. This structure obviously provides a softer stop than that of Fig. 1. The size of the rubber 10 in Fig. 2 is selected so that it will flatten to fill and slot and groove but prevent the door from hitting the solid portion of the stop 15.

In the structure shown in Fig. 3 the door stop member 20 has the groove 11 formed therein. The bottom of this groove is provided with a series of cut-out sections or recesses 21 to form the lower flow chamber rather than the longitudinal slot, the upper flow chamber representing the space between the rubber member and the upper part of the groove as in Figs. 1 and 2. This form provides a door stop that is substantially as soft as the structure of Fig. 2.

In Figs. 4 and 5 the door stop member 12 is the same as that illustrated in Fig. 1 and is provided with the groove 11. However, the under side of the rubber stop member 24 in Fig. 4 is provided with a series of transverse holes or arches 25 leaving intermediate spaced abutments 26. These spaces provide the lower flow chamber producing an increased softness to the door stop.

In Fig. 5 the under side of the rubber member 27 is shaped in a uniform wave similar to that of a sign wave, providing the openings 28 and the abutments 29. The abutments 26 of Fig. 4 and 29 of Fig. 5 may be cemented to the bottom 13 of the groove 11 to retain the rubber stops in place. These forms of sponge rubber stops are soft and flow to fill both the upper and lower flow chambers as well as to collapse the cells within the rubber. This action increases the life of the rubber and also provides a soft but efficient support for receiving the blow of the door and maintaining the weather seal therewith. Stops of this character maintain a pressure against the door and it also keeps vibration from rattling the door. The inner flow chambers may be increased by the transverse openings 30 through the rubber member 27 of Fig. 5.

I claim:

1. A weather strip and cushion door stop comprising a continuous strip constructed for mounting on a door frame in the path of a door, means defining a continuous groove in the face of the strip to be set toward the door, a continuous sponge rubber strip the cross sectional shape of which is substantially truncated and seated uncompressed in the groove and having a portion thereof extending out of the groove all along said strip, and the truncated portion of the continuous sponge rubber strip seated uncompressed within the groove is less than the cross section of the groove to define flow space means between the sides of the groove and the outer truncated surface of the strip to receive and support the deformed portion of the sponge rubber strip when subjected to pressure by the door.

2. A weather strip and cushion door stop comprising a continuous strip constructed for mounting on a door frame in the path of a door, means defining a continuous groove in the face of the strip to be set toward the door, a continuous sponge rubber strip seated uncompressed in the groove and having a portion thereof extending out of the groove all along said strip, means defining a series of deformation space means extending transverse of the width of the sealing strip between the under side of the continuous sponge rubber strip and said groove to form a inner flow space to receive and support the adjacent portion of the continuous sponge rubber strip.

FRANK W. OFELDT.

REFERENCES CITED

The following references are of record in the file of this patent:

UNITED STATES PATENTS

| Number | Name | Date |
| --- | --- | --- |
| Re. 12,014 | Tschieky | July 15, 1902 |
| 345,451 | Rost | July 13, 1886 |
| 350,931 | Holst | Oct. 19, 1886 |
| 733,071 | McGriff | July 7, 1903 |
| 952,854 | Wendlinger | Mar. 22, 1910 |
| 1,037,593 | Cole | Sept. 3, 1912 |
| 1,051,508 | Miller | Jan. 28, 1913 |
| 1,190,310 | Long | July 11, 1916 |
| 1,842,734 | Saives | Jan. 26, 1932 |
| 2,496,084 | Casperson | Jan. 31, 1950 |

FOREIGN PATENTS

| Number | Country | Date |
| --- | --- | --- |
| 772,785 | France | Nov. 6, 1934 |